United States Patent
Brautigam

(10) Patent No.: US 11,413,916 B2
(45) Date of Patent: Aug. 16, 2022

(54) TRAILER HITCH

(71) Applicant: Slingshot Hitch, LLC, Colorado Springs, CO (US)

(72) Inventor: Arthur Brautigam, Colorado Springs, CO (US)

(73) Assignee: Slingshot Hitch, LLC, Colorado Springs, CO (US)

( * ) Notice: Subject to any disclaimer, the term of this patent is extended or adjusted under 35 U.S.C. 154(b) by 85 days.

(21) Appl. No.: 16/947,962

(22) Filed: Aug. 26, 2020

(65) Prior Publication Data

US 2021/0070120 A1 Mar. 11, 2021

Related U.S. Application Data

(60) Provisional application No. 62/897,665, filed on Sep. 9, 2019.

(51) Int. Cl.
  *B60D 1/52* (2006.01)
  *B60D 1/06* (2006.01)
  *B60D 1/48* (2006.01)

(52) U.S. Cl.
  CPC ............. *B60D 1/52* (2013.01); *B60D 1/06* (2013.01); *B60D 1/48* (2013.01)

(58) Field of Classification Search
  CPC .................................................. B60D 1/486
  See application file for complete search history.

(56) References Cited

U.S. PATENT DOCUMENTS

| | | | | | |
|---|---|---|---|---|---|
| 3,598,426 | A | * | 8/1971 | Spiese ................. | B62K 27/003 280/154 |
| 3,993,321 | A | * | 11/1976 | Cote ..................... | B62K 27/12 280/204 |
| D298,022 | S | * | 10/1988 | O'Rourke ............ | D12/162 |
| 6,079,728 | A | * | 6/2000 | Miller .................. | B60D 1/00 280/402 |
| 6,290,247 | B1 | * | 9/2001 | Schafer ................ | B62K 27/12 280/292 |
| 6,305,702 | B1 | * | 10/2001 | Alford, II ............ | B60R 9/06 280/204 |

(Continued)

OTHER PUBLICATIONS

"New Trailer Hitch Polaris Slingshot—Alpha Powersport Trailer Hitch", Web Page <https://www.slingshotforums.com/threads/new-trailer-hitch-polaris-slingshot-alpha-powersport-trailer-hitch.11985/>, Mar. 28, 2016, Retrieved from the Internet on Jan. 13, 2022. (Year: 2016).*

(Continued)

*Primary Examiner* — Kevin Hurley
(74) *Attorney, Agent, or Firm* — Trenner Law Firm, LLC; Mark D. Trenner

(57) ABSTRACT

A trailer hitch is disclosed as it may be implemented for a specialized motor vehicle (e.g., the SLINGSHOT™ by Polaris, Inc.). An example trailer hitch includes a receiver member for mounting to a swing arm assembly for a rear wheel of the specialized motor vehicle. An example trailer hitch also includes a hitch member for connecting to the receiver, the hitch member configured to extend out and around the rear wheel of the specialized motor vehicle. An example trailer hitch also includes a mounting member on the hitch member to provide a mounting location for a trailer connection behind the rear wheel.

17 Claims, 8 Drawing Sheets

(56) References Cited

U.S. PATENT DOCUMENTS

| | | | | |
|---|---|---|---|---|
| 6,406,050 | B1* | 6/2002 | Taggart | B60D 1/06 |
| | | | | 280/292 |
| 7,988,178 | B2* | 8/2011 | Shockley | B60D 1/06 |
| | | | | 280/447 |
| D796,389 | S * | 9/2017 | Chan | D12/162 |
| 9,963,005 | B2 | 5/2018 | Arii et al. | |
| 10,414,462 | B2* | 9/2019 | Kernes | B62K 27/12 |
| 2002/0096859 | A1* | 7/2002 | Versaw | B62K 27/12 |
| | | | | 280/511 |
| 2018/0022175 | A1* | 1/2018 | Connelly | B60P 3/127 |
| | | | | 280/490.1 |

OTHER PUBLICATIONS

"The Only Dealer Tested and Installed Hitch System for the Polaris Slingshot, in the World," printed from the internet (wyckedhitch.com) and available at least as early as Aug. 20, 2020.

"installation Instructions for Installed Hitch System for the Polaris Slingshot," printed from the internet (https://05f2385b-bcc1-468a-9b91-5db9cadf942b.filesusr.com/ugd/b0de55_35793b5e1ad043329661788bda060a6b.pdf) and available at least as early as Aug. 20, 2020.

* cited by examiner

TRAILER HITCH

PRIORITY CLAIM

This application claims the priority benefit of U.S. Provisional Patent Application No. 62/897,665 filed Sep. 9, 2019 titled "Trailer Hitch" of Arthur Brautigam, hereby incorporated by reference in its entirety as though fully set forth herein.

BACKGROUND

The SLINGSHOT™ three-wheeled motor vehicle by POLARIS, INC. is gaining in popularity following its introduction in 2014 as a 2015 model year. The SLINGSHOT™ three-wheeled motor vehicle is manufactured by Polaris Industries in the United States, and is classified as a motorcycle. It has side-by-side bucket seats, but no roof, doors, or side windows. The vehicle has two wheels in the front, and a single wheel in the back. There is no bumper or other attachment place behind the rear wheel. Due to this unique configuration, a traditional trailer hitch for a truck or other vehicle will not work with the SLINGSHOT™ three-wheeled motor vehicle.

DETAILED DESCRIPTION

Figure 1:
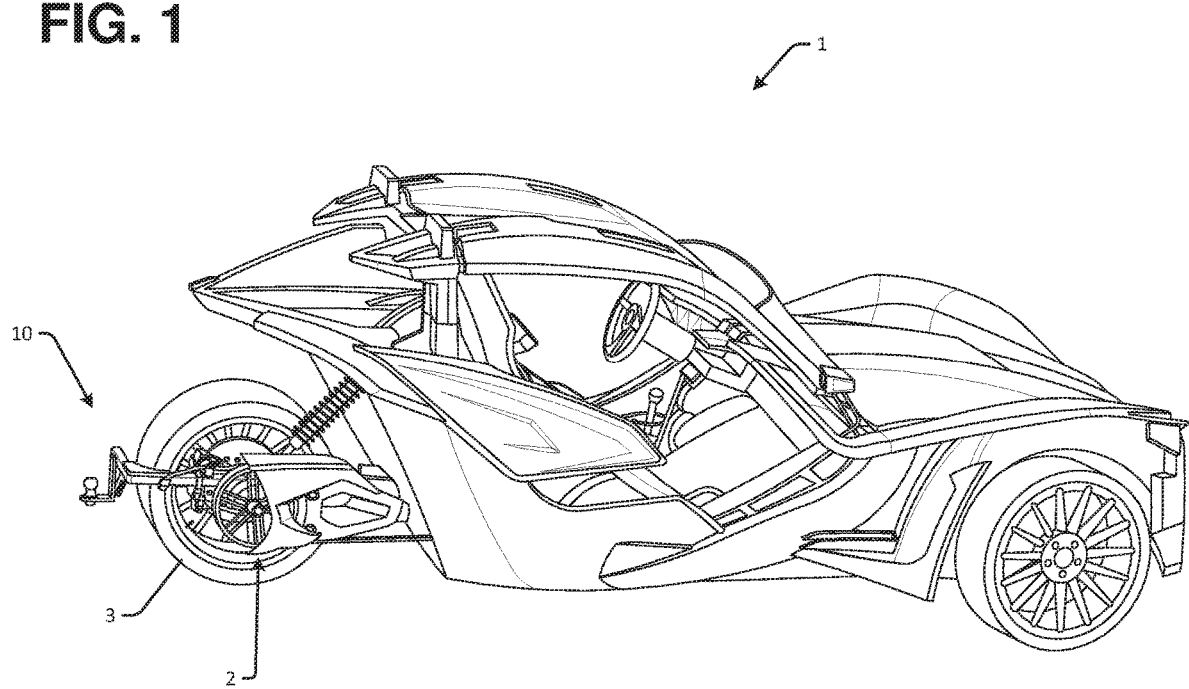
FIG. 1 shows an example specialized motor vehicle with an example trailer hitch.
Figure 2:
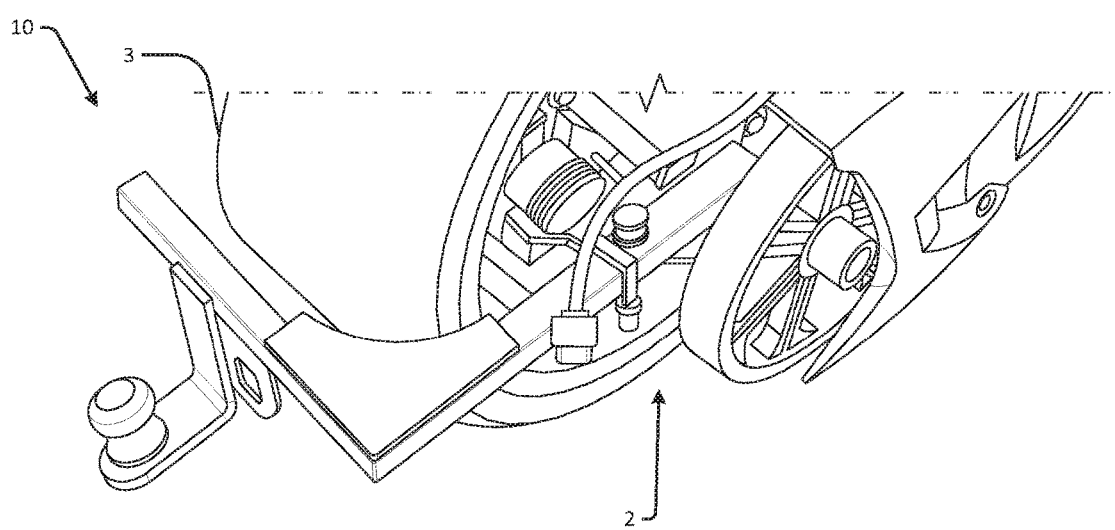
FIG. 2 is a close-up view of the specialized motor vehicle with example trailer hitch.

FIG. 1 shows an example specialized motor vehicle 1 with an example trailer hitch 10. FIG. 2 is a close-up view of the example specialized motor vehicle 1 with example trailer hitch 10. The example trailer hitch 10 enables the example specialized motor vehicle 1 to tow a trailer (not shown), such as a lightweight motorcycle trailer, a bicycle carrier, a luggage rack (e.g., a "cooler carrier"), or the like.

In an example, the trailer hitch 10 mounts to the swing arm 2 on the rear wheel 3 of the specialized motor vehicle 1. In an example, the trailer hitch 10 has a tongue weight rated at about 35 pounds, but is not limited to any rating. The trailer hitch 10 is currently fabricated with high quality steel and is precision manufactured in the United States, although not limited to any particular place, process, or material of manufacture.

An example of the trailer hitch 10 includes a receiver member 12 having a top rail 14 and a side arm 16 for mounting the receiver member 12 to the specialized motor vehicle 1 (e.g., to the "swing arm" or rear wheel assembly 2 for the rear wheel 3). The example trailer hitch 10 also includes a hitch member 20 for connecting to the receiver member 12. The example trailer hitch 10 also includes at least one support bracket 22a, 22b providing support for the structure of the hitch member 20. The example trailer hitch 10 also includes a hitch mount 24 configured with an opening 26 in a lower portion 28 thereof for receiving a hitch ball (not shown) thereon. The example trailer hitch 10 also includes a bracket 30 behind the hitch mount with at least one opening 32a, 32b for attaching safety chain(s) (not shown) between a trailer (not shown) and the specialized motor vehicle 1.

Before continuing, it is noted that as used herein, the terms "includes" and "including" mean, but is not limited to, "includes" or "including" and "includes at least" or "including at least" The term "based on" means "based on" and "based at least in part on."

It is also noted that the term "specialized motor vehicle" as used herein means any motor vehicle with a rear wheel assembly having an exposed tire without any support for mounting a conventional trailer hitch. In an example, the specialized motor vehicle is the SLINGSHOT™ three-wheeled motor vehicle manufactured by Polaris, Inc. and shown for purposes of illustration in FIGS. 1 and 2. However, the trailer hitch 10 described herein may be utilized with other specialized motor vehicles now available or later developed by any manufacturer, and is not limited to use with the SLINGSHOT™ three-wheeled motor vehicle.

The examples described herein are provided for purposes of illustration, and are not intended to be limiting. Other devices and/or device configurations may be utilized to carry out the operations described herein.

The operations shown and described herein are provided to illustrate example implementations. It is noted that the operations are not limited to the ordering shown. Still other operations may also be implemented.

Figure 3:
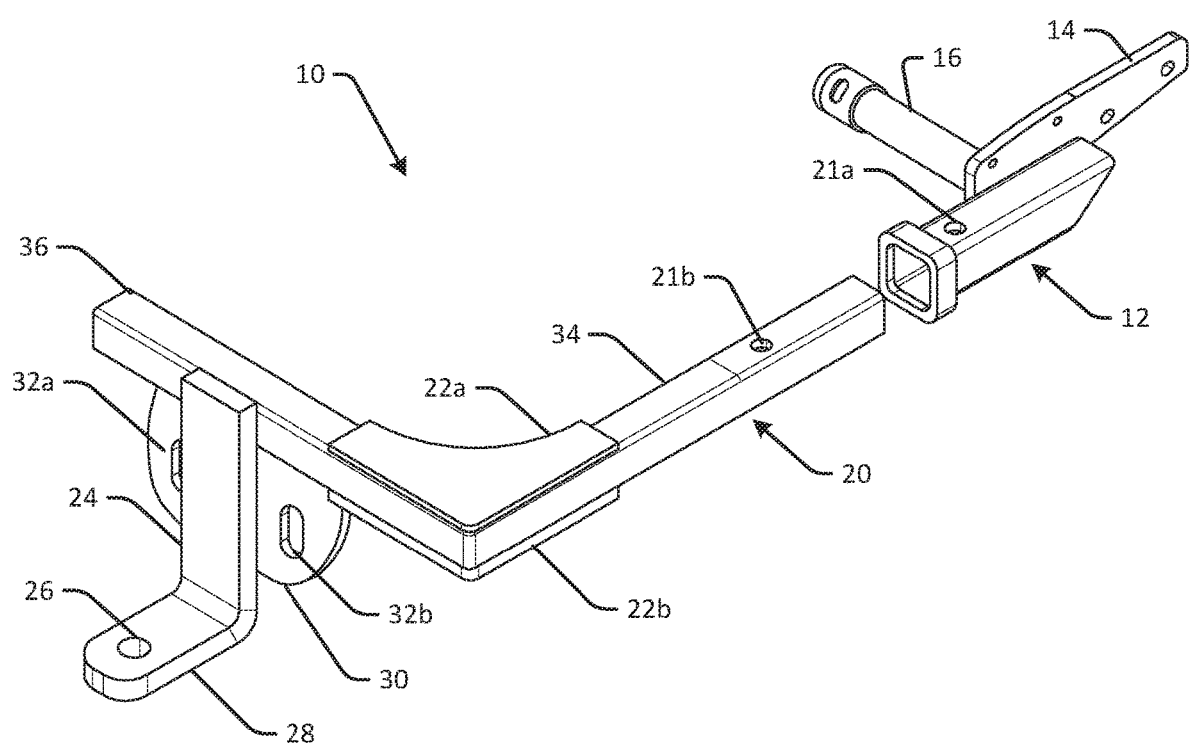
FIG. 3 is a perspective view of the example trailer hitch shown in FIGS. 1 and 2.
Figure 4:
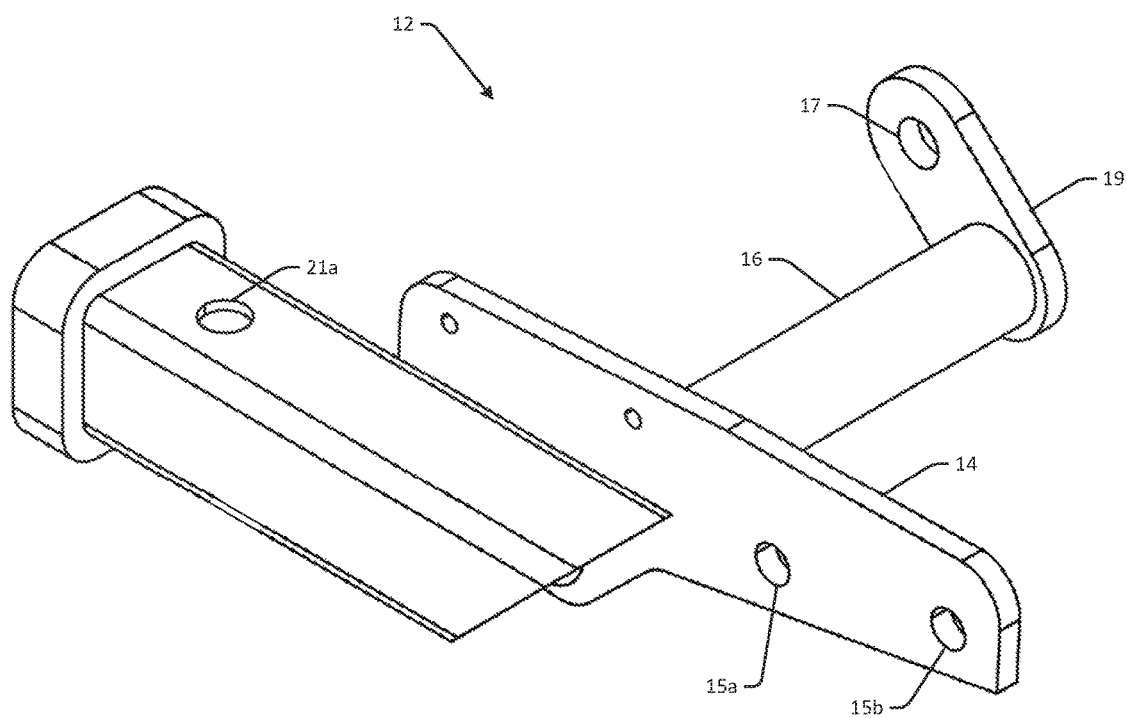
FIGS. 4-6 are perspective views of a receiver member of the example trailer hitch.
Figure 5:
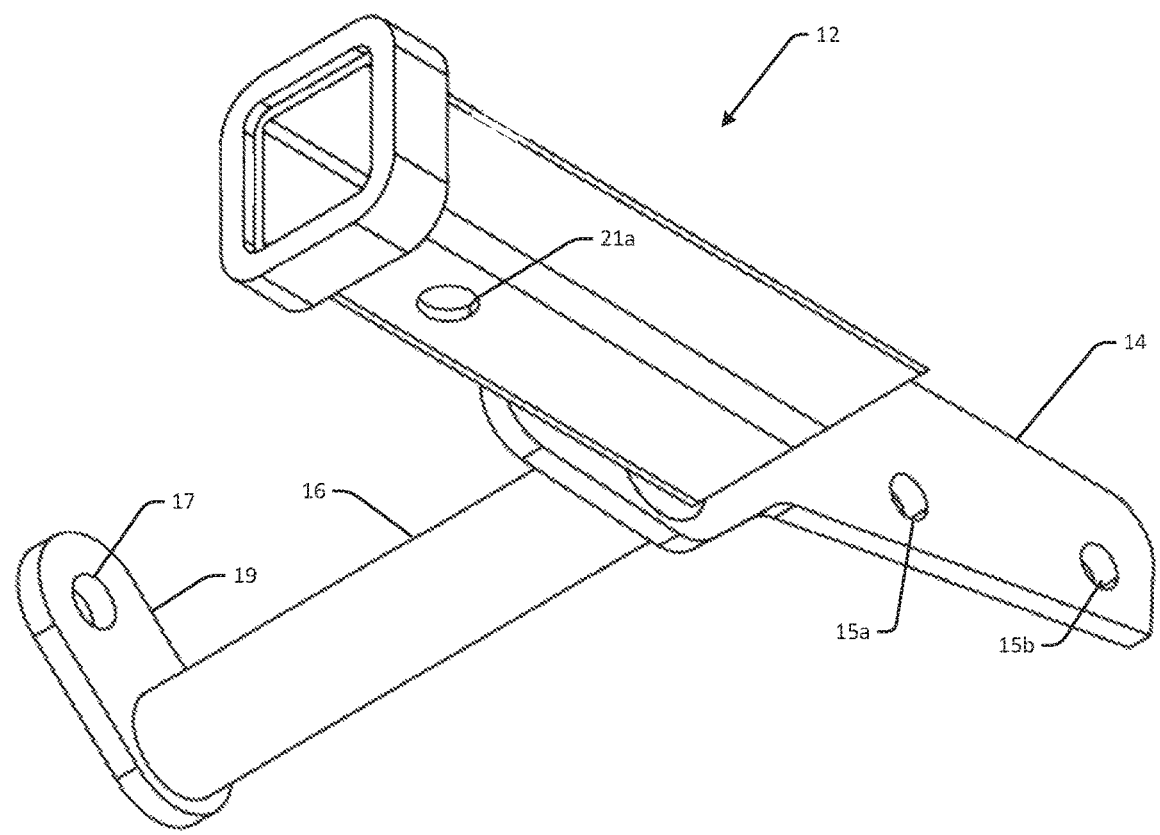
Figure 6:
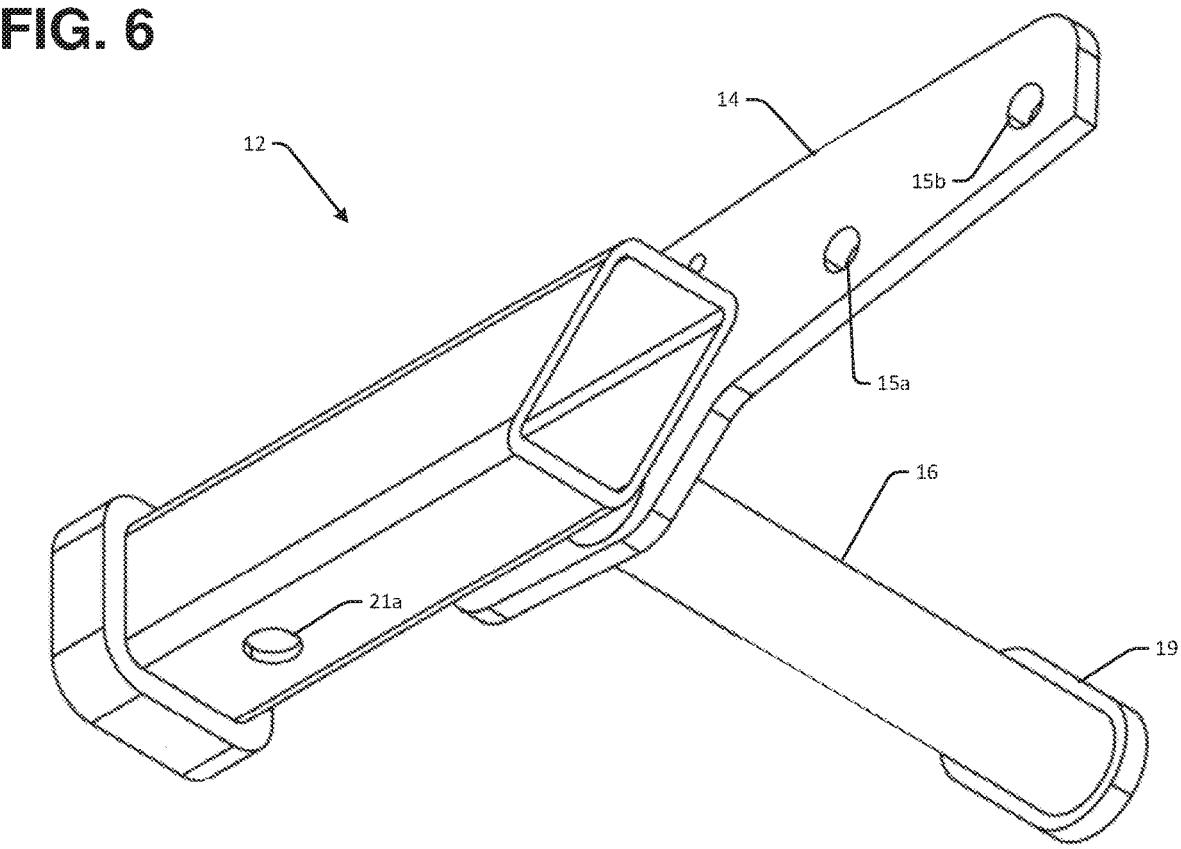
Figure 7:
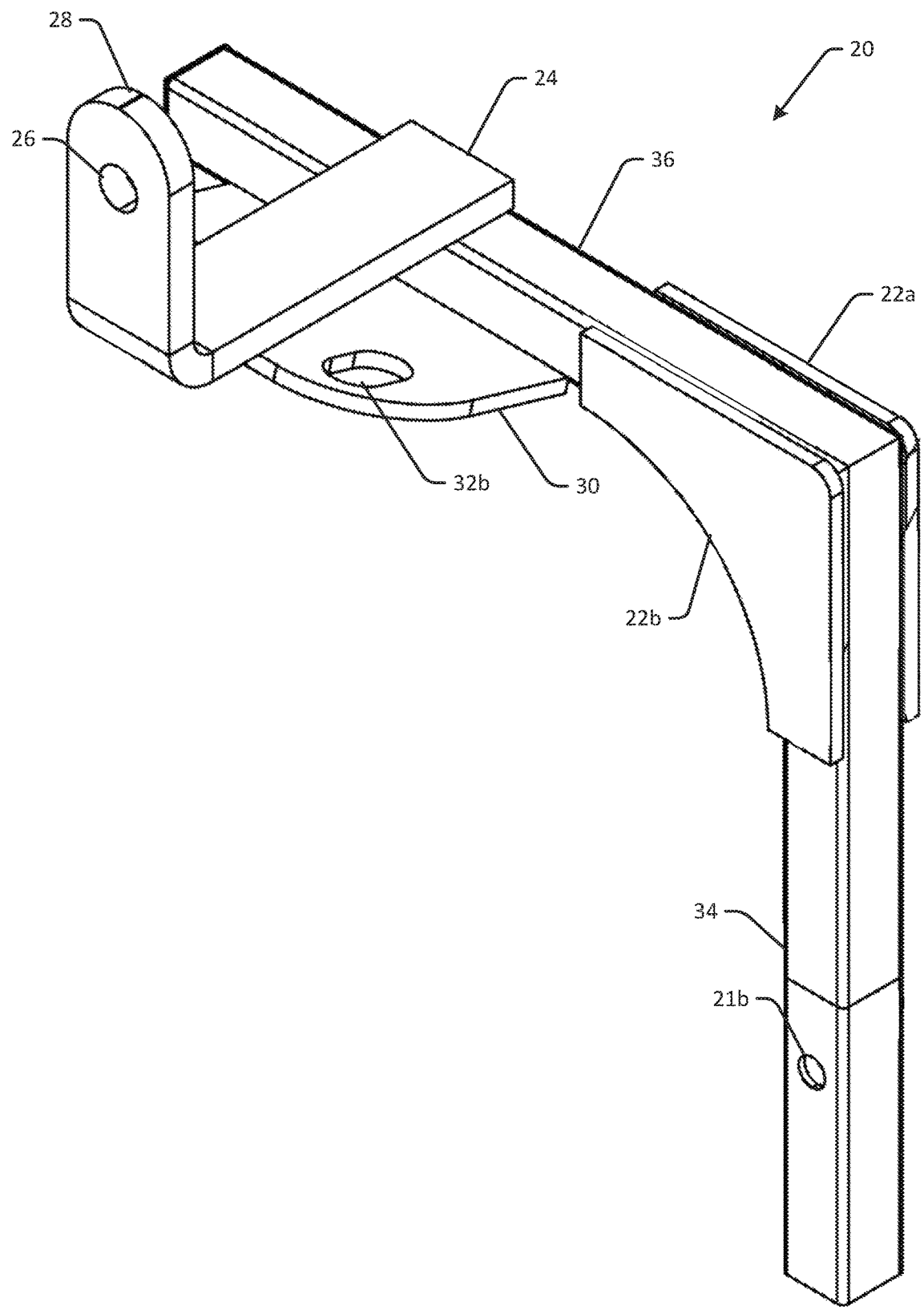
FIGS. 7-8 are perspective views of a hitch member of the example trailer hitch.
Figure 8:
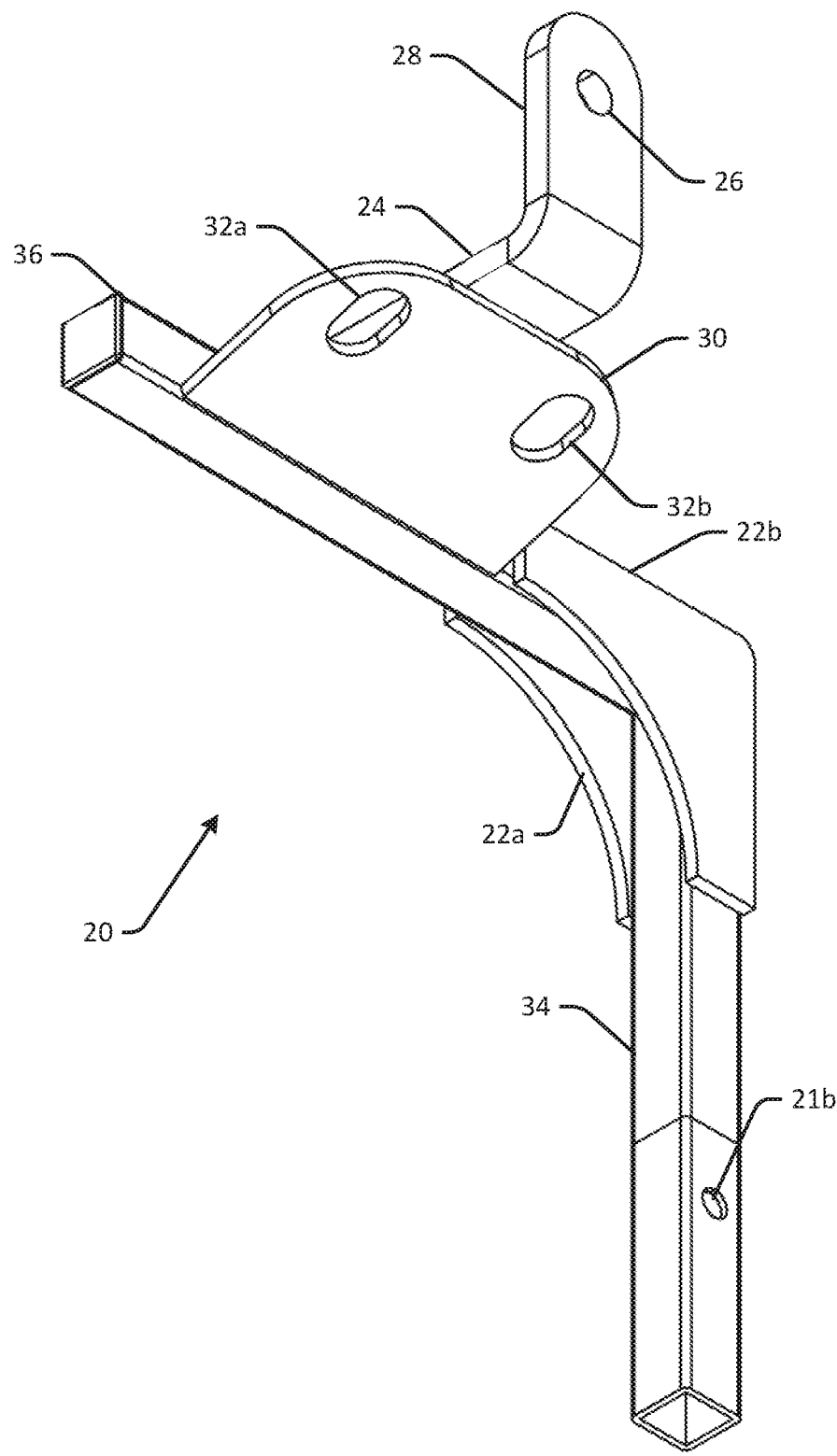

FIG. 3 is a perspective view of the example trailer hitch 10 shown in FIGS. 1 and 2. FIGS. 4-6 are perspective views of a receiver member 12 of the example trailer hitch 10. FIGS. 7-8 are perspective views of a hitch member 20 of the example trailer hitch 10.

An example trailer hitch 10 for a specialized motor vehicle 1 includes a receiver member 12 for mounting to a "swing arm" or wheel assembly for a rear wheel 3 of the specialized motor vehicle 1. The example trailer hitch 10 also includes a hitch member 20 for connecting to the receiver member 12. In an example, the hitch member 20 is removably connected via a hitch pin (now shown) inserted through the corresponding openings 21a, 21b on the top and bottom of the respective tubular components. In another example, the hitch member 20 may be permanently (e.g., welded) or semi-permanently (e.g., bolted) connected to the receiver member 12. In yet another example, the hitch member 20 and the receiver member 12 may be provided as a single component. The hitch member 20 is configured to extend out and around the rear wheel 3 of the specialized motor vehicle 1 (e.g., as shown in FIGS. 1 and 2).

In an example, the trailer hitch 10 includes a mounting member 24 on the hitch member 20. The mounting member 24 may be separately attached (e.g., welded) or formed integral with the hitch member 20. The mounting member 24 provides a mounting location for a trailer connection behind the rear wheel 3 of the specialized motor vehicle 1.

In an example, the trailer hitch 10 includes a side arm 16 on the receiver member 12. The side arm 16 mounts (e.g., through bolt hole 17 in bracket 19) to the "swing arm" or wheel assembly 2 for the rear wheel 3 of the specialized motor vehicle 1 to mount the receiver member 12 to the specialized motor vehicle 1.

In an example, the trailer hitch 10 includes a securement rail 14 on the receiver member 12. The securement rail 14 also mounts to the "swing arm" or wheel assembly 2 (e.g., with bolts through bolt openings 15a, 15b) for the rear wheel 3 of the specialized motor vehicle 1 to provide additional mounting support. In an example, the securement rail 14 also counters rotation and torque generated by a load (e.g., a trailer) connected on the mounting member 24.

In an example, the trailer hitch 10 includes an opening 28 formed through the mounting member 24 on the hitch member 20 for receiving a hitch ball (not shown). Of course, other attachments may also be provided, including but not limited to another receiver so that other receiver mounts can be attached to the trailer hitch 10.

In an example, the trailer hitch 10 includes a bracket member 32 on the hitch member 20. The bracket member may have at least one attachment for providing a safety chain between a trailer and the specialized motor vehicle. For example, the attachment may include one or more opening 32a, 32b formed therein for attaching safety chains. Other attachments may also be provided (e.g., ©-rings). The bracket member 30 may also have at least one attachment (not shown) for providing an electrical connection between a trailer and the specialized motor vehicle. For example, the electrical connector may be attached in one of the openings 32a, 32b shown in FIG. 3.

In an example, the hitch member 20 of the example trailer hitch 10 is substantially L-shaped, as shown in FIG. 3. By way of illustration, the hitch member 20 may have a first component 34 for connecting to the receiver member 12, and a second component 36 connected substantially orthogonal or perpendicular to the first component 34. The second component 36 includes the mounting member 24. In an example, at least one support bracket 22a, 22b is mounted in connection with (e.g., welded to) both the first component 34 and the second component 36 of the L-shaped hitch member 20. In an example, an upper support bracket 22a and a lower support bracket 22b are each mounted in connection with (e.g., welded) both to the first component 34 and the second component 36 of the L-shaped hitch member 20.

It is noted that the examples shown and described are provided for purposes of illustration and are not intended to be limiting. Still other examples are also contemplated. By way of illustration, the L-shaped structure shown in the drawings for purposes of illustration, may be curved or otherwise configured. Nor does the hitch member need to be removable from the receiver member (e.g., these may be permanently affixed and/or formed as an integrated single structure). Additional mounting points may also be provided. Other examples may also include an integrated connection for electrical wiring, adjustable hitch, different and/or additional receiver(s) for receiving a bicycle rack, cooler rack, etc.

Still other aspects whether now known or later developed, will be readily appreciated as being within the scope of this disclosure by those having ordinary skill in the art after becoming familiar with the teachings herein. The examples shown are illustrative only, and not intended to be limiting.

The invention claimed is:

1. A trailer hitch for a specialized motor vehicle, comprising:
    a receiver member for mounting to a swing arm assembly for a rear wheel of the specialized motor vehicle;
    a hitch member for connecting to the receiver, the hitch member configured to extend out and around the rear wheel of the specialized motor vehicle, the hitch member is substantially L-shaped, having a first component for connecting to the receiver member, and a second component substantially orthogonal to the first component, the second component having the mounting member;
    a mounting member on the hitch member to provide a mounting location for a trailer connection behind the rear wheel; and
    at least one support bracket mounted in connection with both the first component and the second component of the L-shaped hitch member.

2. The trailer hitch of claim 1, further comprising a side arm on the receiver member, the side arm mounting to the swing arm assembly for the rear wheel of the specialized motor vehicle to mount the receiver member to the specialized motor vehicle.

3. The trailer hitch of claim 1, further comprising a securement rail on the receiver member, the securement rail mounting to the swing arm assembly for the rear wheel of the specialized motor vehicle to provide support by countering rotational torque generated by a load on the mounting member.

4. The trailer hitch of claim 1, further comprising an opening formed through the mounting member on the hitch member for receiving a hitch ball.

5. The trailer hitch of claim 1, further comprising a bracket member on the hitch member.

6. The trailer hitch of claim 5, wherein the bracket member has at least one attachment for providing a safety chain between a trailer and the specialized motor vehicle.

7. The trailer hitch of claim 5, wherein the bracket member has at least one attachment for providing an electrical connection between a trailer and the specialized motor vehicle.

8. The trailer hitch of claim 1 wherein the at least one support bracket comprises an upper support bracket and a lower support bracket, the upper and lower support brackets each mounted in connection with both the first component and the second component of the L-shaped hitch member.

9. A trailer hitch for a specialized motor vehicle, comprising:
    a receiver member for mounting to a swing arm assembly for a rear wheel of the specialized motor vehicle;
    a side arm on the receiver member, the side arm mounting to the swing arm assembly for the rear wheel of the specialized motor vehicle to mount the receiver member to the specialized motor vehicle;
    a hitch member for connecting to the receiver, the hitch member configured to extend out and around the rear wheel of the specialized motor vehicle; and
    a mounting member on the hitch member to provide a mounting location for a hitch ball to connect a trailer behind the rear wheel of the specialized motor vehicle;
    a bracket member on the hitch member;
    at least one attachment for providing a safety chain between a trailer and the specialized motor vehicle; and
    at least one attachment for providing an electrical connection between a trailer and the specialized motor vehicle.

10. The trailer hitch of claim 9, further comprising a securement rail on the receiver member, the securement rail mounting to the swing arm assembly for the rear wheel of the specialized motor vehicle to provide support by countering rotational torque generated by a load on the mounting member.

11. The trailer hitch of claim 9, further comprising an opening formed through the mounting member on the hitch member for receiving a hitch ball.

12. The trailer hitch of claim 9, wherein the hitch member is substantially L-shaped, having a first component for connecting to the receiver member, and a second component substantially orthogonal to the first component, the second component having the mounting member.

13. The trailer hitch of claim 12, further comprising an upper support bracket and a lower support bracket, the support brackets each mounted in connection with both the first component and the second component of the L-shaped hitch member.

14. A trailer hitch for a specialized motor vehicle, comprising:
   a receiver member for mounting to a swing arm assembly for a rear wheel of the specialized motor vehicle;
   a securement rail on the receiver member;
   a hitch member for connecting to the receiver, the hitch member configured to extend out and around the rear wheel of the specialized motor vehicle; and
   a mounting member on the hitch member, wherein an opening is formed through the mounting member on the hitch member for receiving a hitch ball to provide a mounting location for a hitch ball to connect a trailer behind the rear wheel of the specialized motor vehicle;
   wherein the hitch member is substantially L-shaped, having a first component for connecting to the receiver member, and a second component substantially orthogonal to the first component, the second component having the mounting member, and further comprising an upper support bracket and a lower support bracket, the support brackets each mounted in connection with both the first component and the second component of the L-shaped hitch member.

15. The trailer hitch of claim 14, wherein the securement rail mounts to the swing arm assembly for the rear wheel of the specialized motor vehicle.

16. The trailer hitch of claim 14, further comprising:
   a bracket member on the hitch member;
   at least one attachment for providing a safety chain between a trailer and the specialized motor vehicle; and
   at least one attachment for providing an electrical connection between a trailer and the specialized motor vehicle.

17. The trailer hitch of claim 14, further comprising a side arm on the receiver member, the side arm mounting to the swing arm assembly for the rear wheel of the specialized motor vehicle to mount the receiver member to the specialized motor vehicle.

* * * * *